United States Patent [19]
Greer et al.

[11] 3,990,310
[45] Nov. 9, 1976

[54] CLOSED PRESSURE REBALANCE SYSTEM FOR MEASURING THE RATE OF FLUID FLOW

[75] Inventors: Homer L. Greer, Bryn Athyn; William F. Newbold, Philadelphia, both of Pa.

[73] Assignee: Honeywell Inc., Minneapolis, Minn.

[22] Filed: July 28, 1975

[21] Appl. No.: 599,726

Related U.S. Application Data

[62] Division of Ser. No. 505,758, Sept. 12, 1974, Pat. No. 3,939,708.

[52] U.S. Cl. .............................. 73/398 AR; 73/406; 338/38; 338/42
[51] Int. Cl.² ........................................... G01L 9/02
[58] Field of Search .......... 73/398 AR, 406; 338/38, 338/42, 41

[56] References Cited
UNITED STATES PATENTS

| | | | |
|---|---|---|---|
| 2,743,340 | 4/1956 | Zoltanski | 73/398 AR |
| 2,856,775 | 10/1958 | Niles | 73/398 AR |
| 2,931,225 | 4/1960 | Pleuger | 73/398 AR |

*Primary Examiner*—Donald O. Woodiel
*Attorney, Agent, or Firm*—Laurence J. Marhoefer; Lockwood D. Burton

[57] ABSTRACT

A closed system couples the inlet and outlet pressures generated by a centrifugal pump to a pair of flexible diaphragms which seal the flow tube in a pressure rebalance system for measuring fluid flow. The system is filled with a conducting fluid which forms certain resistance paths whose resistance varies with diaphragm position. This resistance change is used to generate signals which control the pump motor to the end that the diaphragms maintain a predetermined position and the pump head is equal to the differential pressure.

3 Claims, 6 Drawing Figures

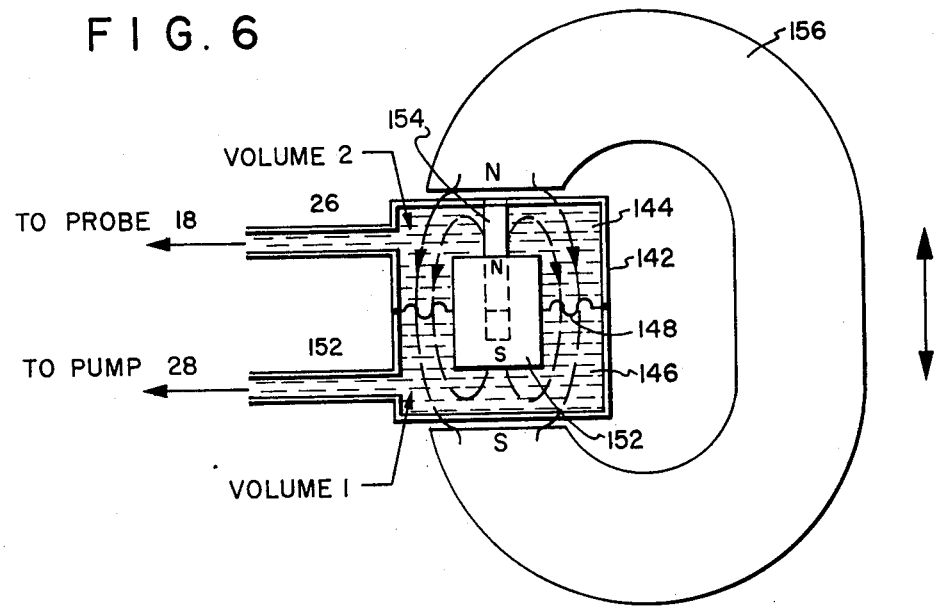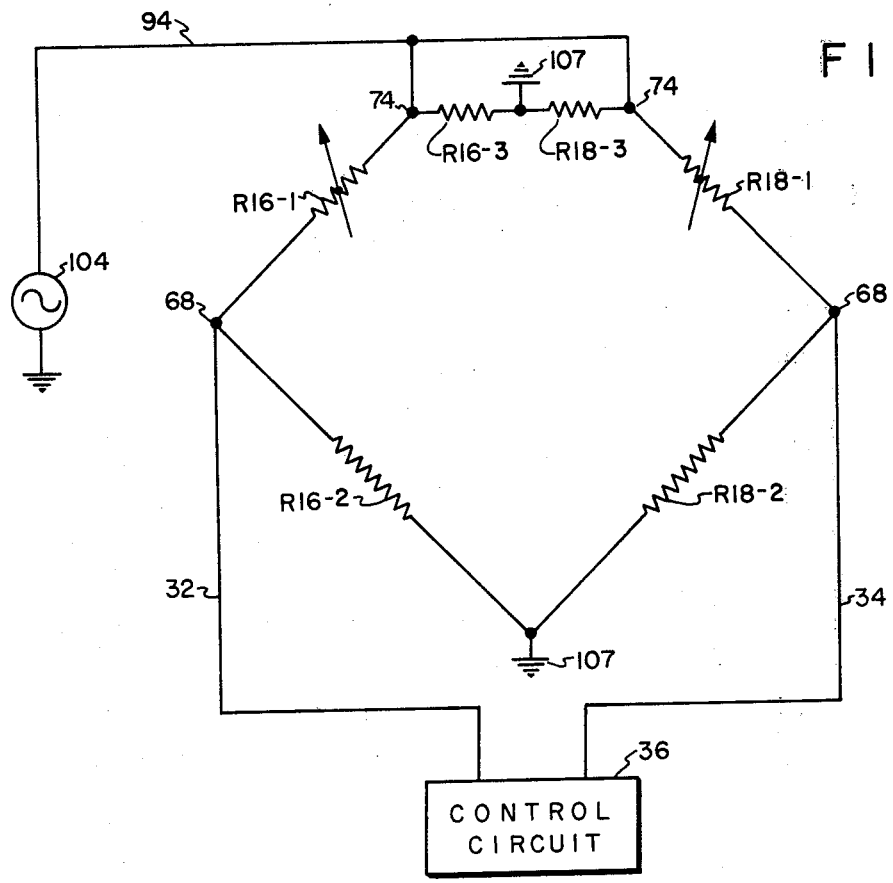

CLOSED PRESSURE REBALANCE SYSTEM FOR MEASURING THE RATE OF FLUID FLOW

This is a division of application Ser. No. 505,758, filed Sept. 12, 1974, now U.S. Pat. No. 3,939,708.

BACKGROUND OF THE INVENTION

1. Field of the Invention

This invention relates to an improved pressure rebalance system for measuring fluid flow and more particularly to such a system which is sealed and thus will not become clogged by particulate matter in the fluid whose flow is being measured.

2. Description of the Prior Art

As it is well understood by those skilled in the art, fluid flow through an orifice, venturi, or other restriction produces a pressure drop which is proportional to the square of the volume rate of flow. Thus, the pressure drop created by the flow through the orifice or venturi can be used to determine this flow rate. One relatively low cost prior art system for determining fluid flow which utilizes such a pressure drop is a so-called pressure rebalance system. In such systems, a port on the high pressure side of the restriction is connected to the input of a centrifugal pump and the pump output is connected to a port on the low pressure side.

A centrifugal pump operating at zero flow produces a head (pressure) which is proportional to the square of the rotational speed of its impeller. Therefore, in a pressure rebalance fluid flow measuring system, the speed of the pump is regulated by a suitable flow rate detector to keep the flow through the pump equal to zero. In this situation the pressure drop through the orifice or venturi is then exactly balanced by and equal to the head produced by the pump and the impeller speed is directly proportional to the volume rate of flow.

Pressure rebalance fluid flow measuring systems of the type broadly described above have proved generally satisfactory for certain applications. A particularly advantageous feature of such pressure rebalance system is their relatively low cost. However, in certain applications their use has been rather severely limited due to various factors including the tendency of the ports to become clogged with particulate matter, and an inability to measure accurately very low fluid flow rates.

SUMMARY OF THE INVENTION

The objects of this invention include, among others, the provision of a pressure rebalance system in which the pressure sensing ports are sealed. An additional object is the provision of a rebalance fluid flow measuring system which compensates for ambient temperature and pressure variations and which is accurate at low rates of fluid flow.

Briefly, this invention contemplates the provision of a pressure rebalance flow measuring system in which flexible diaphragms seal the high and low pressure taps in the flow tube. A conductive fluid balances the pressure exerted on the diaphragm by the fluid flowing in the tube. This conductive fluid fills a small space between a pair of electrodes positioned adjacent to the surface of each diaphragm. The electrodes adjacent each diaphragm are so disposed that the resistivity of the conductive path between these electrodes varies with the movement of the diaphragm and the electrical signal generated by the change in resistivity controls the speed of a centrifical pump impeller which pumps the conductive fluid against the diaphragms. When both diaphragms are in a pressure balanced position the pump head is equal to the difference in pressure at the high and low pressure diaphragms and the motor speed is thus proportional to the rate of fluid flow.

BRIEF DESCRIPTION OF THE DRAWINGS

For a more detailed description of this invention along with additional objects and advantages thereof reference may now be had to the drawings which form a part of this specification and are to be read in conjunction therewith. Like reference numbers are used to identify like parts in the various views. In the drawings:

FIG. 4 is a simplified diagram partially in block form and partially in schematic form of a circuit for controlling the pump motor speed and the static pressure in a pressure rebalance fluid flow measuring system of this invention;

FIG. 6 is a schematic view of one embodiment of an apparatus for providing a zero flow compensating pressure in the system of this invention.

DESCRIPTION OF THE PREFERRED EMBODIMENT

Detailed Description

Figure 1:
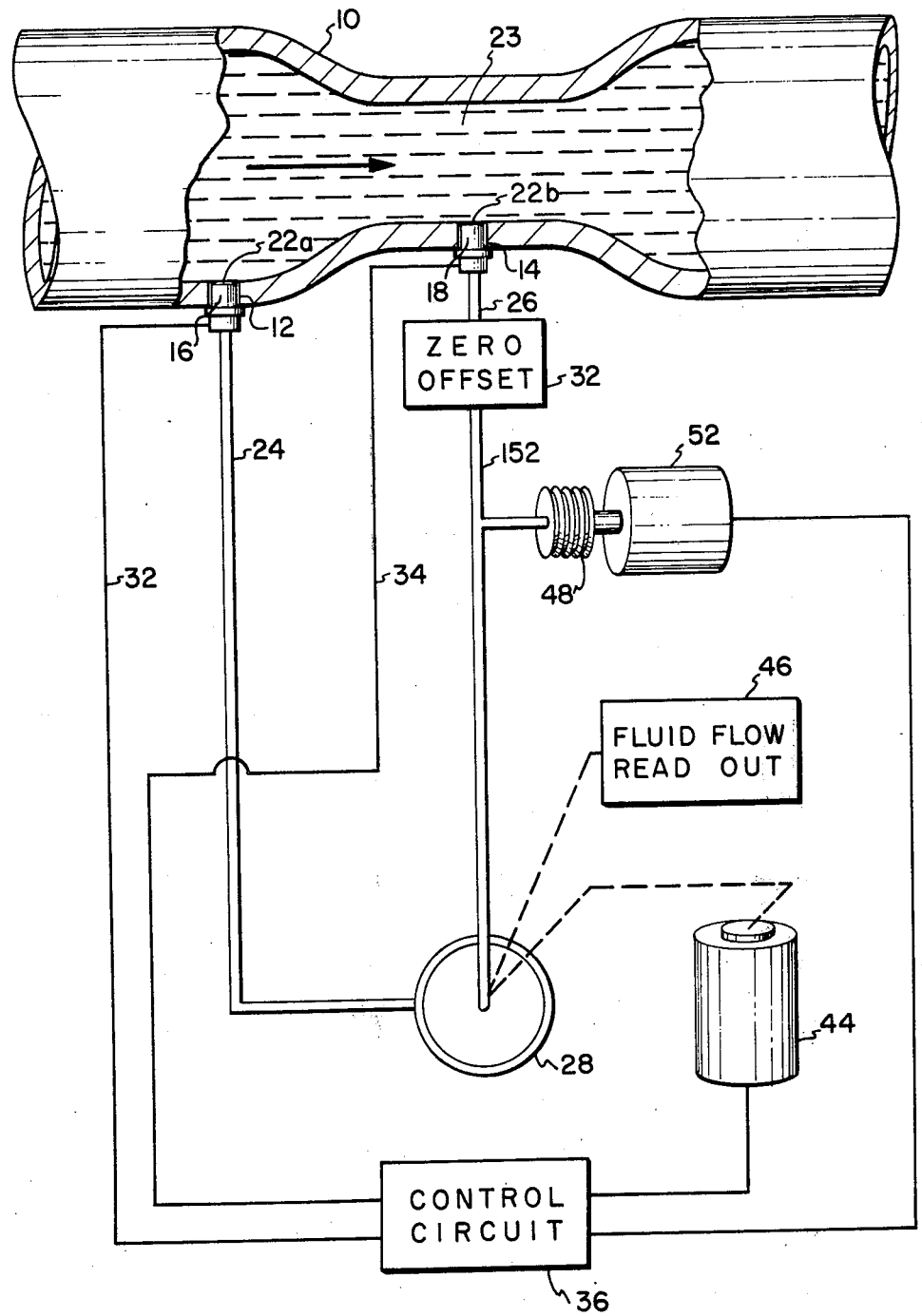
FIG. 1 is a block diagram of one embodiment of a pressure rebalance fluid flow measuring system in accordance with this invention.
Figure 2:
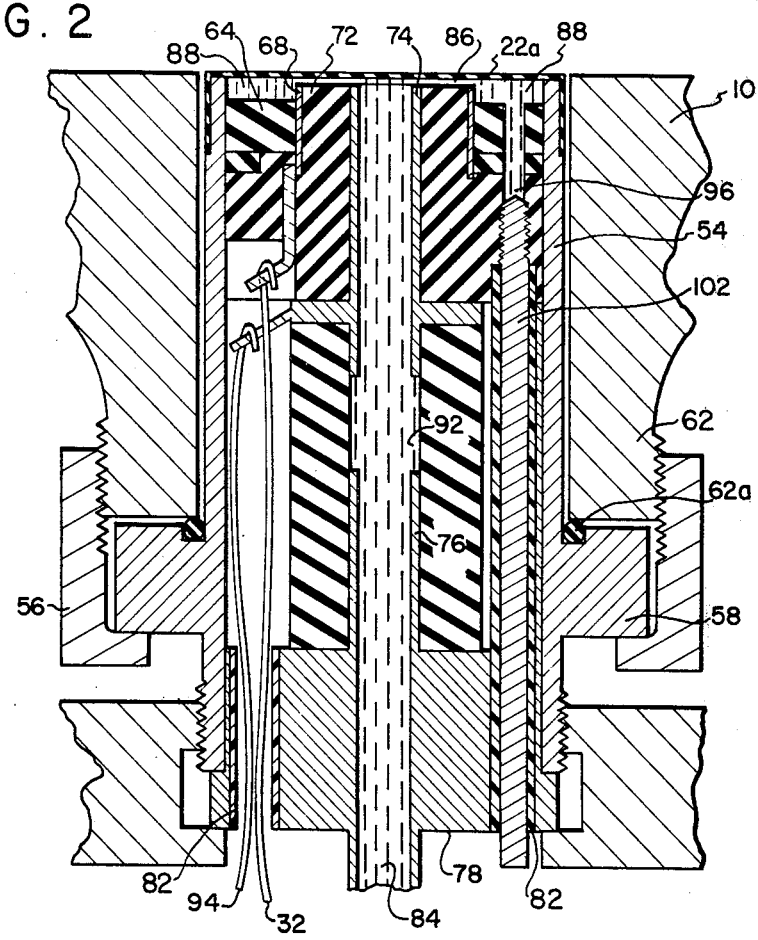
FIG. 2 is a longitudnal sectional view of a temperature compensated probe which can be used in the practice of this invention.

Referring now to FIGS 1 and 2 of the drawings, a flow tube 10 has an upstream high pressure port 12 and a downstream low pressure port 14. The precise location of the ports 12 and 14 will be determined by the design of flow tube and will be in accordance with principles well understood by those skilled in the art. It should be noted that while a venturi type flow tube is illustrated in FIG. 1, the pressure rebalance flow measuring system of this invention can be used with additional flow tubes, such as weirs for example.

Figure 3:
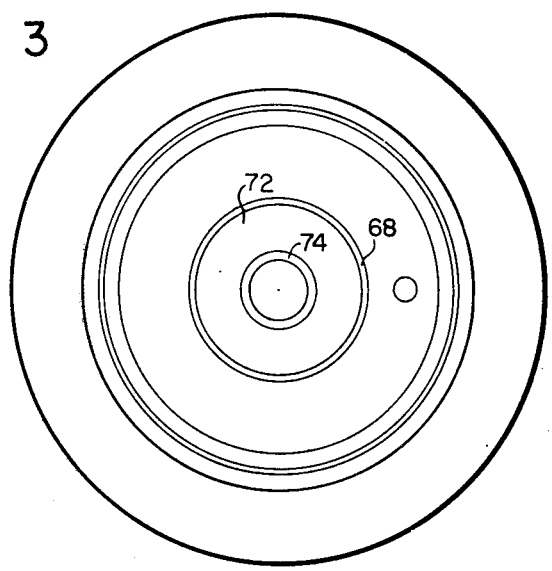
FIG. 3 is an end view of the probe shown in FIG. 2 with the diaphragm removed.

Inserted in the orifices 12 and 14, respectively, are pressure sensing probes 16 and 18. The probes 16 and 18 may be of identical design details of which are shown in FIGS. 2 and 3. The ends of probes 16 and 18 are covered with elastomeric diaphragms 22a and 22b, respectively, which cover the ports 12 and 14 and preferably lay approximately flush with the inner wall of the flow tube 10. Conveniently, the diaphragms 22a and 22b may be made of silicone rubber or other suitable material known in the art.

A fluid 23 flowing from left to right in FIG. 1 exerts one pressure on diaphragm 22a and another different pressure on diaphragm 22b. A conductive fluid carried by capillary tubes 24 and 26 serves to exert pressure on the other side of each diaphragm equal to that exerted by flowing fluid. With a flow of fluid 23 in the assumed direction, the pressure on diaphragm 22a exceeds that on 22b. Capillary 24 therefore is connected to the output of a centrifugal pump 28 and capillary 26 is connected to its input via a zero flow pressure compensating device 32 whose operation will be explained in connection with FIG. 6. This zero-offset device permits an adjustment of the static pressure of the conductive fluid to match the pressure of the fluid 23 under zero flow conditions.

Pump 28 serves to exert pressures on the diaphragms 22a and 22b to balance the pressure exerted the flowing fluid 23 in the tube 10. When the pressures are balanced, the rotational speed of the pump 28 is proportional to the rate of flow of the fluid in tube 10. As will be explained in detail in connection with FIGS. 2 and 3, a conductive fluid fills a region between a pair of electrodes adjacent each diaphragm. As the diaphragms move, the resistivity of the conductive path between the conductors changes and a signal generated in this manner is coupled by electrical leads 32 and 34 to a control circuit 36.

Control circuit 36 compares the inputs from leads 32 and 34 and produces a first output signal which controls the rotational speed of a direct current motor 44 which is coupled to and drives the impeller of pump 28. In operation, if diaphragm 22a is depressed inwardly from a position flush with the wall of tube 10 and diaphragm 22b bulges outwardly, the differential signal causes an increase in the speed of pump 28. This in turn causes an increase in pressure on diaphragm 22a and a corresponding decrease on 22b. When the input signals from leads 32 and 34 are balanced, both diaphragms are flush with the inner wall of the flow tube and the pump head is equal to the differential pressure exerted by the flowing fluid on the diaphragm. In this situation the rotational speed of the pump is proportional to the volume rate of flow in tube. A tachometer 46 or other suitable apparatus for measuring rotational speed of the impeller of pump 28 is coupled to the pump impeller and can be calibrated to read out directly the volume rate of flow without further square root extraction.

In addition, controller 36 compares a common-mode input signal from the probes on leads 32 and 34 with a fixed reference signal and produces a second input signal for adjusting the static pressure of the pressure rebalance system to match the static pressure in the flow tube 10. In the embodiment shown, the apparatus for adjusting static pressure comprises a bellows 48 coupled to and driven by a direct current (d.c.)electric motor 52. If both diaphragms bulge into the flow tube slightly an output from controller 36 enegizes motor 52. As the motor rotates it drives a suitable mechanical linkage, such as a screw linkage, to cause the bellows to expand and reduce the static pressure of the system. When the diaphragms are in a predetermined nominal position, the common-mode signal equals the reference signal and the motor 52 stops.

Referring now to FIGS. 2 and 3, the high pressure probe 16 is shown in detail. It will be understood that the low pressure probe 18 is identical in construction. In each probe, an elastomeric diaphragm, 22a or 22b, respectively, is bonded to a cylindrical housing 54, which also serves as a primary ground electrode. An inwardly directed shoulder on a nut 56 engages a peripheral flange 58 formed on cylindrical housing 54. Nut 56 engages a threaded boss 62 on tube 10 and thereby secures the probe to the tube. An O-ring pressure seal 62a prevents a leakage of fluid from the flow tube 10.

An electrically insulating press washer 64 supports a first cylindrical conductor 68 so that one end of the conductor is spaced closely to the inner surface of elastomeric diaphragm 22a. An insulator 72 supports a second inner cylindrical inner conductor 74 concentrically with the conductor 72 and with its end also spaced closely to the elastomeric diaphragm 22a.

A third cylindrical electrode 76 is disposed coaxially with electrode 74 by means of an insulator 75 and a plastic insulating tube 82 lining the inside of housing 54 which engages an expanded portion 78 of the electrode 76. Conductor 76 is connected to the flow tube potential (ground) at the probe junction box (not shown).

A conductive fluid 84, such as salt water, fills the hollow electrodes 74 and 76 and also fills the small narrow region 86 between the ends of electrodes 68 and 74 and the diaphragm 22a. The fluid, which fills the space between the inner conductor 74 and the outer conductor 68, forms an electrically conducting path between these two members whose resistance changes markedly with changes in the position of diaphragm 22a. A region 88 between the outer conductor 68 and the housing 54 is also filled with the conductive fluid 84 which forms conductive path between the conductor and the housing 54. As the volume of conductive fluid in this region 88 is considerably larger than the volume in the region 86, the resistance of the path formed by volume does not change appreciably with changes in diaphragm position.

The conductive fluid 84 forms yet another conductive path between conductor 74 and conductor 76 in the region marked 92 in FIG. 2. It will be appreciated that the resistance of this path does not change with changes in diaphragm position.

A lead 94 connects a source of alternating power to the inner conductor 74 and signal lead 32 is connected to the outer conductor 68. A bleed hole 96, which in operation is plugged by a stopper 102, allows the probe to be filled completely by providing a passage for expressing air as the fluid initially fills the probe.

It will be appreciated that the probe shown in this illustrative embodiment provides a sensitive, stable apparatus for electrically sensing the position of the diaphragm and in addition provides a solid backing for the diaphragm at the flow pipe wall. The exact dimensions of the diaphragm are not critical but close spacing between the diaphragm and the insulated landing between electrodes 68 and 74 is important.

For example, the spacing between the ends of these electrodes and the surface of the diaphragm adjacent these electrodes is preferably on the order of about 0.007 inches and the landing is preferably flush with the electrodes. The overall length of the sensor from the diaphragm to the junction box should be as long as necessary to permit mounting usually about 1 ½ inches.

Preferably the probe housing 54 is metallic and has direct metal to metal contact with the flow tube. The conductive fluid 84 is electrically coupled to the flow tube potential through the secondary ground electrode 76 and through the probe outer shell 54 in the region of the diaphragm. Electrodes 68 and 74 are electrically isolated from each other and from all other conductive parts of the probe except the electrical leads 32 and 94 and the region where electrodes contact the conductive solution.

The conductive solution 84 fills the cavity in back of the diaphragm and also the central passageway through conductors 74 and 76 thereby transmitting the hydraulic pressure generated by the pump 28 to the inner surface of the diaphragm. In addition, the conductive solution forms resistive elements between the various electrodes as shown schematically in FIG. 4.

Referring now to FIG. 4 in addition to FIG. 2, the conductive solution 84 forms a number of conductive paths between the various electrodes in each of the probes 16 and 18. These conductive paths have appreciable resistance and are shown schematically as resistance elements in FIG. 4; the low pressure probe 16 has resistive elements R16-1, R16-2, and R16-3 and the high pressure probe 18 has elements R18-1, R18-2, and R18-3. For simplicity these resistance elements will sometimes be referred to as R-1, R-2, and R-3 when in context the explanation applies to both probes.

Element R-1 in each probe is formed by the fluid which fills the narrow space between the surface of the diaphragm 22 and surface of the insulating material 72 which extends to the tips of the conductors 68 and 74. As this space is quite narrow, the resistivity of the path between the conductors varies markedly as the diaphragm moves and changes the thickness of the resistive element. It will be appreciated that as the diaphragm moves away from the tips of conductors 68 and 74 the volume of the conductive material filling the space between the electrodes increases, thereby decreasing the resistance of the path. Conversely, as the diaphragm moves towards the ends of these electrodes the volume decreases, increasing the resistance.

The resistance element R-2 in each probe is formed by the conductive fluid which fills the space 88 bounded by the electrode 68, the diaphragm 22a, the insulating washer 64 and the outer wall 54 of the probe. It will be appreciated that the resistive elements R-1 and R-2 in each probe will be at the same temperature; that of the fluid flowing through the flow tube because these resistive elements are located adjacent one another and there is a negligible temperature gradient across the diaphragm 22. In addition the metallic flow tube wall, which also contacts the flowing fluid, is in good thermal contact with the wall 54 of each probe. The junction box end of the probe is thermally isolated from electrodes 68 and 74 by the gap 92 between the secondary ground electrode 76 and the electrode 74.

Preferably small gauge electrical wire should be used for the conductors 94 and 32 in order to limit the thermal effects of these conductors upon the electrodes.

The gap 92 in each probe form resistors R-3 which due to the geometry of the probe may not be at the same temperature as resistors R-1 and R-2. However, as will become apparent from the operation of the circuit of FIG. 4, it is not critical to the successful operation of the flowmeter to have R-3 at the same temperature as R-1 and R-2.

Lead 94 connects a source of alternating current (a.c.) potential 104 to electrode 74 of each of the sensors 16 and 18. With respect to each sensor, therefore, the ratio of the potential at electrode 68 with respect to that at 74 is determined by the ratio of the R-2 resistance value to the total resistance of R-1 plus R-2. Since the region that forms both resistances are filled with the same conductive fluid, both have the same resistance versus temperature coefficients and therefore, since the temperature of both resistors change together the ratio of their input to output voltage depends only on the cavity geometry which is determined essentially by the motion of the diaphragm.

The value of R-3 does not affect the inter-relationship of R-2 and R-3. Therefore, as long as R-3 is large as compared to the impedance of source 104, the exact value of R-3 or the fact that the value may vary is of not consequence to the diaphragm position measurement.

It should be noted also that since the electrical interface between the different materials can generate a d.c. potential and also because of the possibility of a chemical reaction, it is preferably to use an a.c. exciting voltage source 104.

As will be appreciated by those skilled in art from an inspection of FIG. 4, the resistance elements in probes 16 and 18 form a bridge circuit by virtue of the interconnection of the resistance elements R-1, R-2, and R-3 in each probe and the flow tube 10 which forms a common ground for each probe. These grounds are indicated schematically in FIG. 4 by reference numeral 107.

An a.c. energizing source 104 is coupled to electrode 74 which is shown schematically as a junction point in FIG. 4. Similarly leads 32 and 34 couple the electrode 68 of the probes 16 and 18, respectively, to the input of the control circuit 36 whose operation will be explained in connection with FIG. 5.

It will be appreciated that for probe 16 the amplitude of the signal at electrode 68 is proportional to the ratio of resistance R16-1 to R16-2. As resistance R16-2 does not change appreciable with diaphragm position, the magnitude of the signal at terminal 68 of probe 16 is thus proportional to the position of the diaphragm. Obviously, the same explanation applies to probe 18 and these two signals are used to control the pump 28 and the bellows 48.

Figure 5:
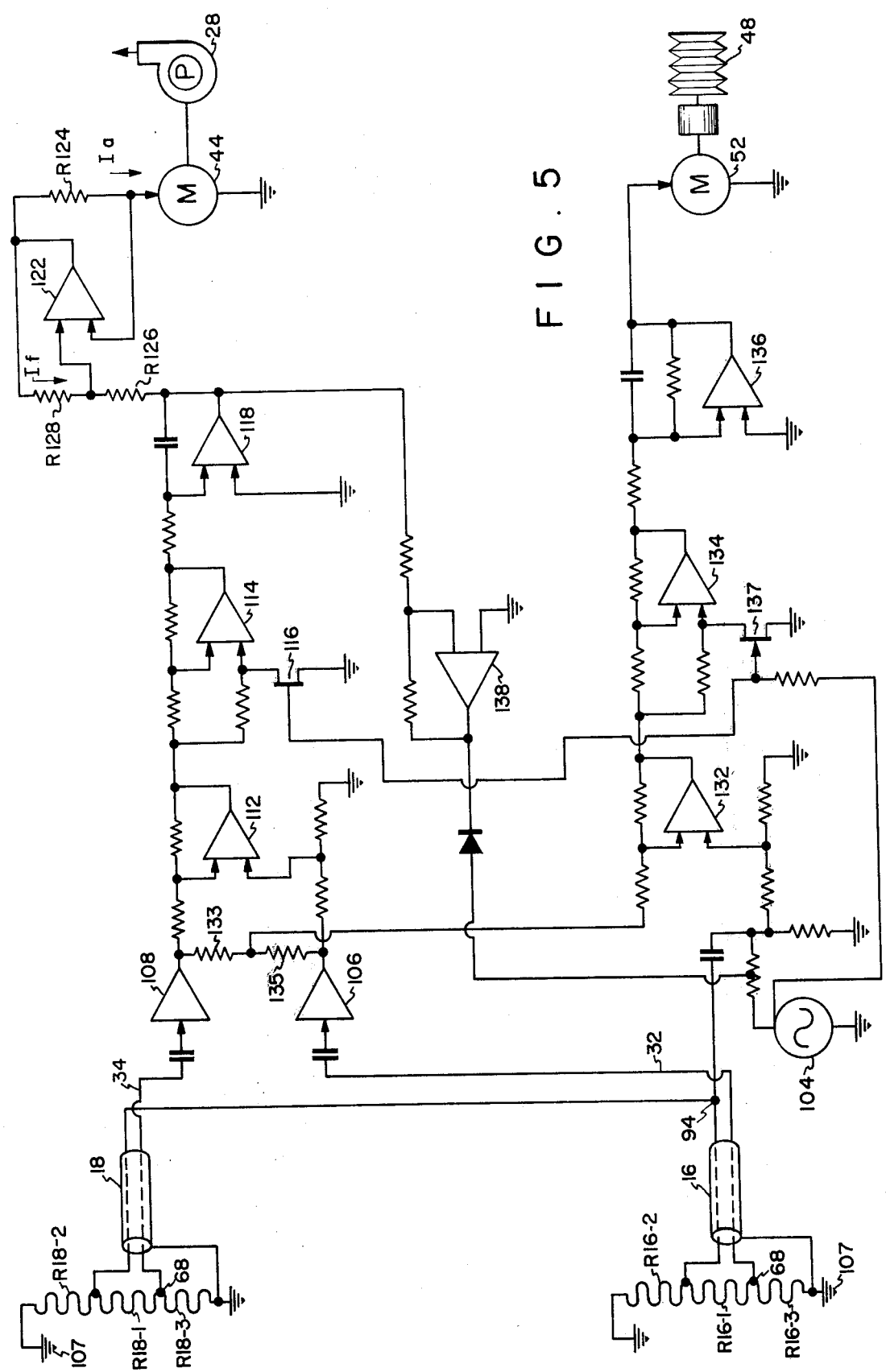
FIG. 5 is a more detailed schematic diagram of the circuit of FIG. 4 showing additional details of a preferred embodiment of the circuit.

Referring now to FIG. 5 in addition to FIG. 4, the potential at electrode 68 of high pressure probe 16 is capacitively coupled to an input to an isolating amplifier 106, whose a.c. output signal is proportional in magnitude to the position of the high pressure diaphragm. As pressure in the tube 10 increase and the diaphragm moves towards the tips of electrodes, the output of amplifier 106 increases in voltage amplitude. Similarly, the electrode 68 of the low pressure probe 18 is capacitively coupled as an input to a second isolating amplifier 108 whose a.c. output is proportional to the position of the low pressure diaphragm position. For example, as pressure in tube 10 decreases on the low pressure diaphragm, the output of amplifier 108 decreases in voltage amplitude.

A differential amplifier 112 compares the outputs of amplifiers 106 and 108 and produces an a.c. output signal which is proportional to the magnitude of the difference between its inputs. This output from differential amplifier 112 is coupled to one input of a phase sensitive demodulator 114 whose d.c. output is proportional in magnitude to the differential position of the high and low pressure diaphragms and whose polarity is a function of which diaphragm is depressed furthest from the tube wall. A field effect transistor (FET) 116 coupled to the a.c. energizing source 104 develops the phase reference signal input for the phase sensitive demodulator.

An integrating amplifier 118 integrates the output of demodulator 114 and this signal controls the speed of the centrifugal pump drive motor 44 to the end that the pump 28 is driven at a speed to keep the diaphragms deflected the same amount. When this is achieved, the differential pressure generated by the centrifugal pump 28 between its inlet and outlet equals the differential pressure applied to the diaphragms by the fluid flowing in the tube 10. As the detail circuits for performing functions of isolating amplifiers 106 and 108, and the functions of comparitor 112, comparitor 114 and integrator 118 are well known to those skilled in the art, these details will not be given here.

Preferably, the centrifugal pump drive motor 44 is a direct current servo motor having a permanent magnet field. In controlling the speed of this motor in response to the output of amplifier 118, the rotational speed of the motor can be measured directly by means of a tachometer or other suitable device and the signal thus developed can be used in a conventional servo loop to balance the input signal. However, the circuit shown in FIG. 5 is preferable in that it provides good control of the motor speed at low speeds in the presence of load and brush resistance variations. Here, an operational amplifier 122 serves to maintain the back electamotive force (E.M.F.) of the motor 42 directly proportional to the output of integrator 118. Since the back E.M.F. of a permanent magnet d.c. motor is linearly related to its rotational speed, the speed is thus maintained as a function of the output of integrator 118.

In the preferred circuit, a resistor R124 couples the output of amplifier 122 to one side of the armature of motor 44 the other side of which is coupled to ground. Another resistor R126 couples the output of amplifier 118 to one input of amplifier 122 and the applied armature potential is fedback to the other input of amplifier 122. A feedback resistor R128 couples the output of amplifier 122 back to its input.

The applied armature voltage ($V_m$) which is fed back to one input of amplifier 122, equals the armature current ($I_a$) drop through the internal motor resistance ($R_m$) plus the back emf of the motor, i.e. $V_m = I_a R_m +$ the motor back emf. If the voltage across R126 equals the internal resistance drop across the motor ($I_a R_m$) the input signal to amplifier 122 will equal the applied armature voltage which is fed back when the back emf of the motor equals the output of amplifier 118.

In order for $I(f)$ R126 to equal $I_a R_m$ then $(_{(f)}$ R128 must equal $I_a$ R124 since both branches of the circuit are driven from output of amplifier 122. This relation will obtain if $$\frac{R128}{R124} = \frac{R126}{R_m}.$$

The magnitude of the feedback current $I_{(f)}$ need only be large compared to the bias currents required by the amplifier input and will not adversely affect the operation of the system as long as the output power and impedence of amplifier 118 are matched to the low impedence input requirements of the system. Thus, the output impedance of amplifier 118 should be small compared to that of R128 and R126 and the feedback current large compared to the input bias required for amplifier 122.

In order to maintain the diaphragms flush with the inside wall of the flow tube when the system is in a balanced state, a differential amplifier 132 compares average output of amplifiers 106 and 108, which is developed across a pair of equal resistors 133 and 135, with a reference signal developed by a voltage divider resistance network coupled to a.c. energizing source 104 and produces an output signal whose magnitude is proportional to the difference between its input signals. A second phase sensitive demodulator 134 is coupled to the output of amplifier 132 and it provides a d.c. output signal whose magnitude is a function of the magnitude of any variation of the average position of the diaphragms from a flush position and whose polarity is a function of the direction. An FET 137 develops a demodulator phase reference for amplifier 134. An integrator 136 integrates the output of synchronous demodulator 134 and produces an output signal which controls bellows motor 52.

In operation, if the average output of amplifiers 106 and 108 decreases, the error signal applied to the input amplifier 132 produces an output which causes motor 52 to rotate and expand the bellows 48 until the average output of amplifiers 106 and 108 equals the reference signal applied to amplifier 132. At this time the motor stops. Similarly, if the average output increases, the bellows contracts until the inputs to amplifier 132 are rebalanced. It will be appreciated that a bellows is merely one example of an apparatus for adjusting the static pressure of the system.

In order to achieve good low speed performance characteristics without having the system gain so high speeds that oscillation occurs, an automatic gain control circuit comprising difference amplifier 138 reduces the a.c. drive voltage amplitude to the sensors linearly as the motor speed increases. To this end, the output of integrator 118 is coupled to one input of amplifier 138 the other input of which is coupled to a reference source such as ground potential. The output of amplifier 138, whose magnitude is a function of the magnitude of the output of amplifier 118, is coupled to a.c. energizing source 104 and reduces the d.c. bias level of the applied voltage as the motor speed increases.

When the fluid in the flow pipe is stagnant, pressure balance should exist through out the system. However, if the two sensors are not at the same height and/or if the fluid in the flow tube is not exactly the same density as the conductive fluid in the closed system, a pressure balance will not exist unless one of the diaphragms exerts a counter balancing force on the liquids. Although the necessary pressure in certain instances could be created by tensioning the diaphragms, this is undesirable. Preferably, the static pressure between the two sensor diaphragms is balanced by means of a third diaphragm. FIG. 6, to which reference is now made, shows one preferred embodiment of each apparatus. However it will be appreciated that there are many alternate methods of creating a zero offset pressure. Here, a flexible diaphragm 148 separates a fluid cavity 142 into two compartments; 144 and 146. A short capillary tube 26 connects the compartment 144 to the pressure sensor 18. A second capillary 152 couples the other cavity 146 to the input of the centrifical pump.

A permanent magnet 152 is secured to the diaphragm and rides freely on a guide 154 which contrains it to move in a direction perpendicular to the surface of diaphragm. A suitable mechanical supporting member (not shown) supports the cavity 142 in the gap of C shape permanent magnet 156. The C shaped magnet 156 is moveably supported by another suitable means (not shown) so that it can be moved relative to the magnet 152. Moving the magnet 156 upwardly or downwardly with respect to the magnet 152 causes the diaphragm 148 to move correspondingly and equalize any static pressure differential between the high and the low pressure probes.

Thus it will be appreciated that the objects of this invention have been accomplished. The parts in the flow tube 10 are sealed and no particulate matter can enter the system. In addition the system compensates for changes in ambient temperature and pressure and can measure low flow rates.

The embodiments of the invention in which an exclusive property or privilege are claimed are defined as follows:

1. A fluid-pressure to electrical-signal transducer comprising in combination:
a housing;
means defining an opening in said housing;
a flexible diaphragm;
means supporting said diaphragm so that it covers said opening;
a pair of electrodes;
means supporting said electrodes in a spaced apart position closely adjacent said diaphragm;
said electrodes and said diaphragm forming a small fluid receiving region whose volume varies with variations in diaphragm position;
a conductive fluid filling said region and providing a conductive path between said electrodes which conductive path experiences an appreciable change in impedance with changes in the volume of said region caused by variations in said diaphragm position,
means for coupling a source of energizing potential to said electrodes; and
means for coupling an output signal from said electrodes which output signal is a function of the impedance fluid forming the conductive path between said electrodes.

2. A fluid-pressure to electrical-signal transducer as in claim 1 wherein said electrodes comprise a pair of concentrically mounted tubular members.

3. An electrode as in Claim 2 wherein the inner of said pair of concentrically tubular electrodes provides, in part, a fluid path for bearing the pressure of the fluid in said small region.

* * * * *

UNITED STATES PATENT OFFICE
CERTIFICATE OF CORRECTION

Patent No. 3,990,310            Dated November 9, 1976

Inventor(s) Homer L. Greer and William F. Newbold

It is certified that error appears in the above-identified patent and that said Letters Patent are hereby corrected as shown below:

Claim 1, column 10, line 11, before "fluid" insert

--of the--

Signed and Sealed this

Eighteenth Day of January 1977

[SEAL]

*Attest:*

RUTH C. MASON
*Attesting Officer*

C. MARSHALL DANN
*Commissioner of Patents and Trademarks*